US008064367B2

(12) United States Patent
Sin et al.

(10) Patent No.: US 8,064,367 B2
(45) Date of Patent: Nov. 22, 2011

(54) MULTIPLE VOICEMAIL ACCOUNT SUPPORT FOR A VOIP SYSTEM

(75) Inventors: Sam K. Sin, San Jose, CA (US); Jan Fandrianto, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1250 days.

(21) Appl. No.: 11/466,962

(22) Filed: Aug. 24, 2006

(65) Prior Publication Data

US 2007/0121885 A1     May 31, 2007

Related U.S. Application Data

(60) Provisional application No. 60/737,876, filed on Nov. 18, 2005.

(51) Int. Cl.
| | |
|---|---|
| H04L 12/16 | (2006.01) |
| H04L 12/66 | (2006.01) |
| H04L 12/28 | (2006.01) |
| H04L 12/54 | (2006.01) |
| H04Q 11/00 | (2006.01) |
| H04M 1/64 | (2006.01) |
| H04M 7/00 | (2006.01) |
| H04M 5/00 | (2006.01) |
| G06F 15/16 | (2006.01) |

(52) U.S. Cl. ........ 370/259; 370/352; 370/392; 370/410; 370/428; 379/88.12; 379/88.17; 379/88.22; 379/220.01; 379/265.09; 709/203; 709/206; 709/207; 709/227

(58) Field of Classification Search ................. 370/259, 370/410, 352, 392, 428; 709/206, 207, 203, 709/227; 379/201.01, 88.12, 88.22, 220.01, 265.09; 348/14.01

See application file for complete search history.

(56) References Cited

U.S. PATENT DOCUMENTS

| | | | |
|---|---|---|---|
| 6,615,236 B2 * | 9/2003 | Donovan et al. | 709/203 |
| 6,980,640 B2 | 12/2005 | Rice | |
| 7,257,201 B2 * | 8/2007 | Singh et al. | 379/88.13 |
| 2002/0071429 A1 * | 6/2002 | Donovan | 370/352 |
| 2004/0057570 A1 | 3/2004 | Power et al. | |
| 2004/0120316 A1 | 6/2004 | McCormack et al. | |
| 2005/0148362 A1 * | 7/2005 | Jagadeesan et al. | 455/555 |
| 2005/0232406 A1 | 10/2005 | Kauppinen | |
| 2006/0025114 A1 * | 2/2006 | Bales et al. | 455/413 |
| 2007/0121602 A1 * | 5/2007 | Sin et al. | 370/356 |
| 2007/0121884 A1 * | 5/2007 | Sin et al. | 379/219 |
| 2008/0165942 A1 * | 7/2008 | Provenzale et al. | 379/142.01 |

OTHER PUBLICATIONS

R. Mahy, RFC: 3842—A Message Summary and Message Waiting Indication Event Package for the Session Initiation Protocol (SIP), Aug. 2004, pp. 1-19.*
B. Campbell et al., RFC 3087—Control of Service Context using SIP Request-URI, Apr. 2001, pp. 1-39.*

* cited by examiner

*Primary Examiner* — Alpus H Hsu
*Assistant Examiner* — Jeremy Costin
(74) *Attorney, Agent, or Firm* — Haynes and Boone, LLP

(57) ABSTRACT

In one embodiment, a method includes receiving, at an IP private branch exchange (IP PBX), an event notification message from a user agent corresponding to a voicemail system. The event notification message includes a Request-URI field identifying a Uniform Resource Identifier (URI) of the IP PBX and a header field identifying a target mailbox. The method also includes identifying a URI corresponding to the target mailbox and forwarding the event notification message with a Request-URI field identifying the URI corresponding to the target mailbox.

23 Claims, 4 Drawing Sheets

MULTIPLE VOICEMAIL ACCOUNT SUPPORT FOR A VOIP SYSTEM

RELATED APPLICATION

This application claims the benefit of priority from U.S. provisional patent application Ser. No. 60/737,876, filed on Nov. 18, 2005, entitled "Supporting Multiple Voice Mailboxes with a Single Voice Mail Account by Embedding Mailbox ID into SIP NOTIFY Messages," the disclosure of which is incorporated herein in its entirety.

BACKGROUND

A company wishing to provide telephone service to the members of the company may utilize a private branch exchange (PBX). Each telephone set that connects to and is served by the PBX is referred to as a client station or station. The use of a PBX may help to avoid the burden and cost of separately connecting each of the company's telephone sets to the public switched telephone network (PSTN). In addition, a PBX may provide additional advanced features which may not be achievable by connecting the stations directly to the PSTN. For example, the PBX may provide improved privacy when calling between stations, since conventional calls on the PSTN are transmitted across a public network, which is subject to eavesdropping. In addition, the PBX may provide additional services, such as call park, call pickup, call transfer, and call forward to other stations. Voice Over Internet Protocol (VoIP) has seen increased widespread usage. An IP PBX is a type of PBX that connects to client stations on the private side via an IP network, and connects to an Internet Telephone Service Provider (ITSP) on the public side via an IP network. The ITSP includes PSTN gateways, which provide PSTN termination services. Voicemail services for the client stations may also be provided by the ITSP or from a separate voicemail service provider, such as an Internet Voice Mail Service Provider (IVMSP).

A client station that is assigned a voice mailbox is notified by the voicemail server when there is a change in the status of its mailbox. The station may then turn its message waiting indicator (MWI) lamp on or off, depending on the latest status of the mailbox. Using Session Initiation Protocol (SIP) as the signaling protocol, a conventional implementation of voicemail functionality requires that each station subscribe, either explicitly or implicitly, to the message-summary event notification from the voicemail server. This subscription establishes a binding of the mailbox to that particular PBX station. The binding includes such information as the ID of the mailbox and the IP address and port number that the voicemail server will use to contact the client station. If the IP PBX supports multiple stations, each with a different mailbox ID, then each station shall create a separate subscription with the voicemail server. As a result, the service provider (SP) supporting the voicemail server will maintain a separate subscription for each mailbox, each with a different User ID and password. All of this increases the administrative burden and cost associated with providing voice mailboxes to the client stations.

DETAILED DESCRIPTION

Figure 1A:
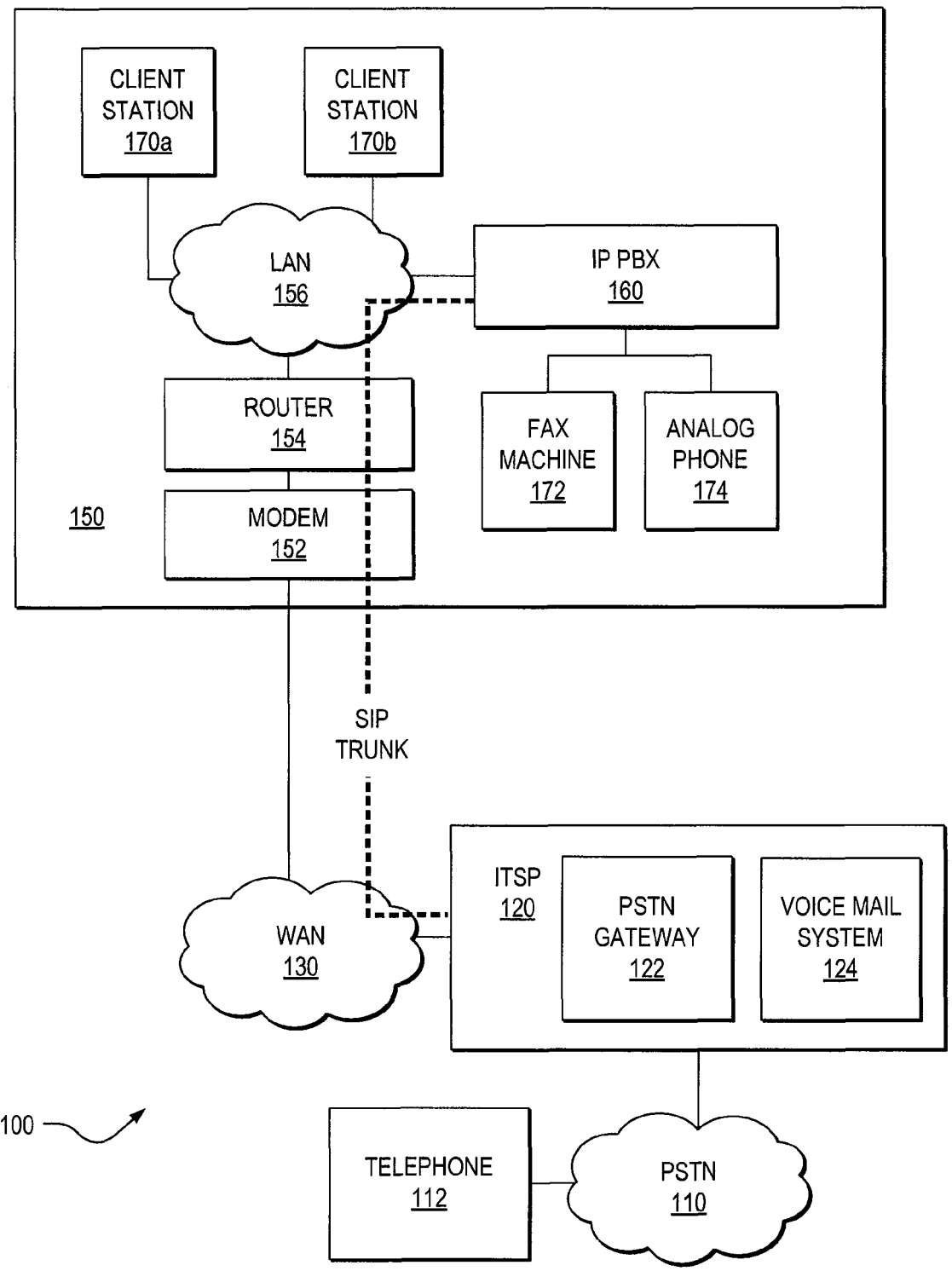
FIGS. 1A-1B illustrate example telecommunications systems.

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

As used herein, the singular forms "a", "an" and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

A PBX may be viewed as having two sides: a private side where the PBX exchanges signaling and media information with its client stations, and a public side where it connects to the PSTN to exchange signaling and media information with the telephone company. The PBX's public connection with the PSTN is typically referred to as a trunk, and the public side is typically referred to as the trunk side. In a traditional PBX system, the trunk may be implemented as a T1 or T3 line.

Session Initiation Protocol (SIP) is an application-layer control protocol that can establish, modify, and terminate multimedia sessions such as Internet telephony calls. SIP is defined in RFC-3261, "SIP: Session Initiation Protocol," which is incorporated by reference herein in its entirety. Where SIP is used as the signaling protocol between an IP PBX and its associated ITSP, the logical connection between the IP PBX and the ITSP is referred to as a SIP trunk. The IP PBX may route SIP calls received from the ITSP to a target station in the IP PBX's SIP network.

In particular embodiments, a single communications device may be configured to support multiple voice mailboxes using a single subscription of a primary mailbox account with a voicemail service provider (SP). This can apply to an IP PBX that obtains PSTN termination services from an ITSP and voicemail services from the same ITSP or a separate Internet Voice Mail Service Provider (IVMSP). The IP PBX may have the form factor of a typical VoIP ATA (Analog Telephone Adapter) and can serve one or more client stations (e.g., telephones, etc.). The IP PBX registers only a single mailbox address (e.g., the "main account") with the voicemail SP. The voicemail SP should have the knowledge of which voice mailboxes are associated with this main account. When one of the mailboxes experiences a change in status (e.g., a new voicemail message is received), the voicemail SP notifies the IP PBX by sending it a SIP message (e.g., a SIP NOTIFY message). The Mailbox-ID associated with the updated mailbox is embedded inside this SIP NOTIFY message (e.g. by specifying the Mailbox-ID in the "TO" field of the SIP NOTIFY message header as an additional parameter). When the IP PBX receives this NOTIFY message, it extracts the embedded Mailbox-ID from the message header, maps the Mailbox-ID to one or more client stations that it is serving (using any suitable internal protocol), and routes the NOTIFY message to the corresponding stations accordingly. With this method, the voicemail SP only maintains one account to service the IP PBX, with a single User ID and password.

FIG. 1A illustrates a telecommunications system 100 in particular embodiments. In this system 100, an ITSP 120 provides the connection between the PSTN 110 and a packet-based network, such as a WAN 130 (e.g., the Internet). The ITSP 120 provides a PSTN gateway 122 which terminates calls originating from telephones 112 on the PSTN 110 with target client stations on the WAN 130. The system 100 also includes a customer location 150, which includes a modem 152 that provides an interface to the WAN 130. A router 154 may provide multiple connections to a Local Area Network (LAN) 156. An IP PBX 160 is provided in the customer location 150 for routing SIP calls received from the ITSP 120.

It will be understood that the arrangement shown in FIG. 1A is merely example and other variations are possible. For example, the IP PBX 160 may provide the routing and/or modem function in addition to providing the telecommunications functions as will be described in further detail below. The IP PBX 160 may also operate as an Analog Telephone Adapter (ATA) and include two Foreign Exchange Station (FXS) ports for connection with an analog telephone 174, a fax machine 172, or a music source adapter. The IP PBX 160 may also contain components that operate as a SIP proxy server and media proxy server, as will be described in greater detail below. Finally, the IP PBX 160 may contain components that serve as a configuration server, which serves configuration files to client stations and auto-configures unprovisioned client stations, and as an application server for supporting advanced call features, such as call park/pickup, directory, directed call pickup, and group paging.

Figure 1B:
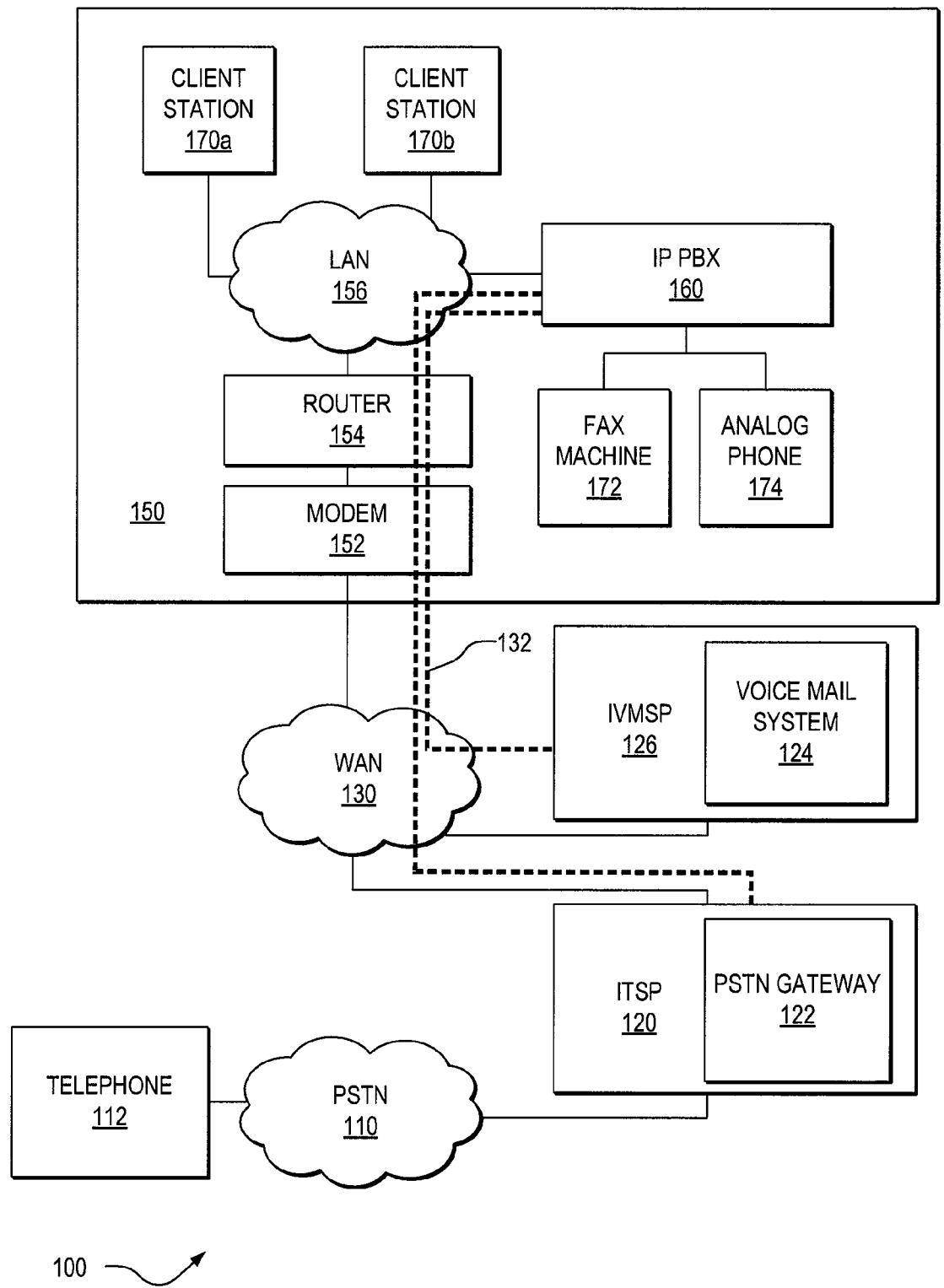

FIG. 1B illustrates a telecommunications system 200 similar to the telecommunications system 100 except that in this embodiment, the voicemail services are provided by a separate service provider, an IVMSP 126. In this case, a first SIP trunk 131 is used for telephone service from the ITSP 120b and a second SIP trunk 132 is used for voicemail services from the IVMSP 126. In some cases, an IP PBX may receive only voicemail services from an IVMSP without telephone service from an ITSP.

Figure 2:
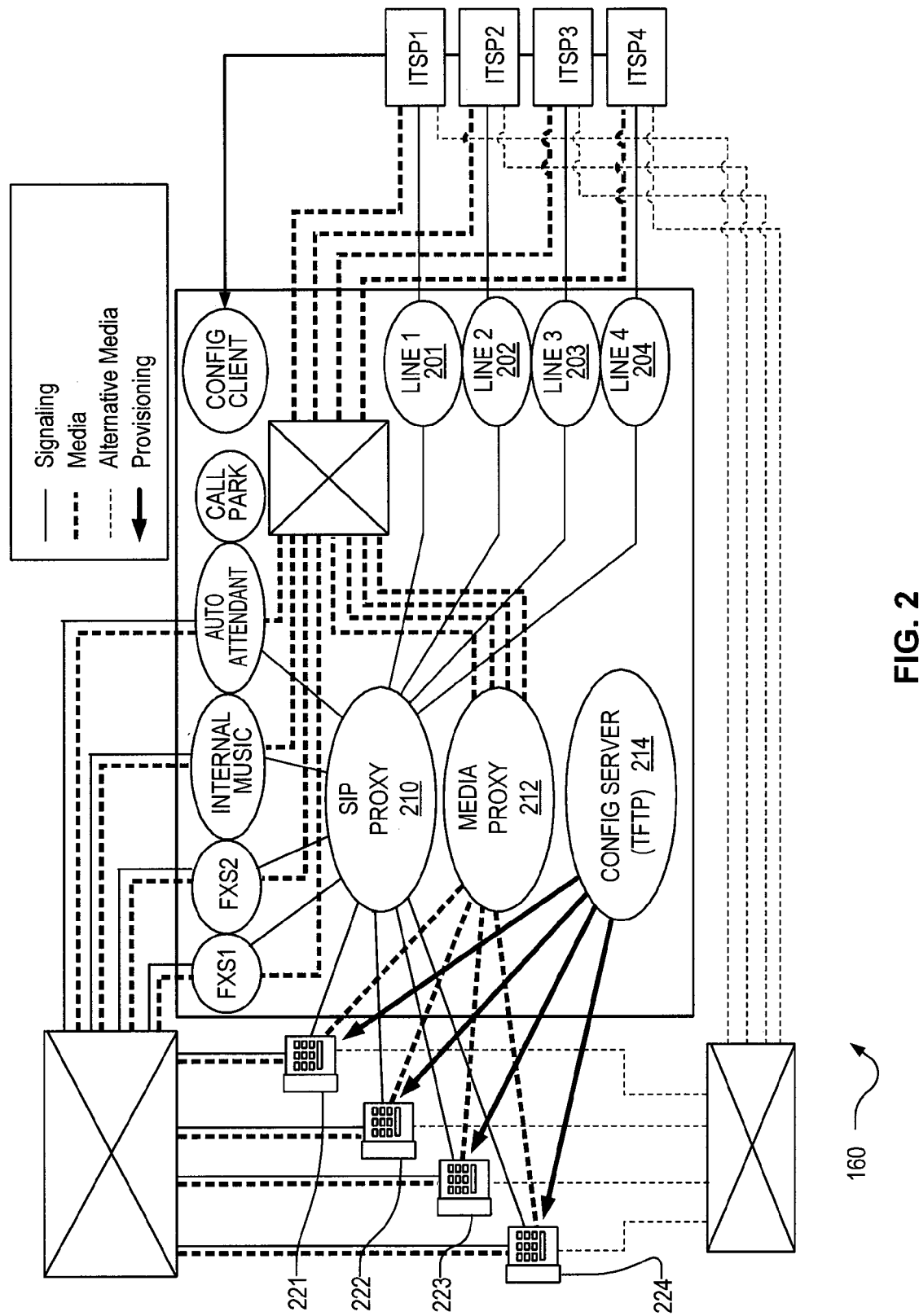
FIG. 2 illustrates an example architecture of an IP PBX.

FIG. 2 illustrates an example architecture of an IP PBX 160 in particular embodiments. The IP PBX 160 includes one or more logical line interfaces (e.g., four line interfaces 201-204, as shown in FIG. 2). Each line interface 201-204 corresponds to an ITSP SIP account from which the IP PBX obtains PSTN termination services. Each SIP account is characterized by a User ID (unique within the ITSP domain), and optional password, and a package of features and resources associated with the account based on the service contract between the IP PBX operator and the ITSP. Each line interface 201-204 is logically connected with the ITSP office equipment to realize a SIP trunk. The resources associated with the account may include a main number and/or a group of Direct Inward Dial ("DID") numbers that are allocated to this SIP trunk. Each line interface 201-204 can be configured with the same or a different ITSP, thereby providing connectability with as many different ITSPs as there are line interfaces (e.g., up to four different ITSPs, such as ITSP1-ITSP4, as shown in FIG. 2). An advantage of having a plurality of line interfaces is that a different ITSP may be used for different countries or regions. For example, when a station is used to call a PSTN number in Japan, the IP PBX may be configured to detect the country code dialed and automatically select the line interface associated with a Japanese ITSP.

The SIP proxy server component 210 in the IP PBX 160 accepts Registration from the client stations. The private side of the SIP proxy server component 210 serves the client stations (including external and internal clients) and the public side of the SIP proxy server component 210 interfaces with the ITSP.

In some embodiments, there are 5 internal clients that register implicitly with the SIP proxy server component 210: FXS1, FXS2, Internal Music (IMUSIC), Parking-Lot (PL), and Auto-Attendant (AA). The FXS1 and FXS2 clients correspond to the two physical FXS ports. The IMUSIC client, when called, automatically answers and plays internally stored audio to the caller. PL is used to maintain calls that are parked. AA is a scriptable auto-attendant application. The FXS1 and FXS2 clients can handle, e.g., up to 2 calls simultaneously. In other embodiments, such as when the FXS1 or FXS2 component of the IP PBX 160 is configured as a Streaming Audio Server (SAS), the FXS1 or FXS2 client may handle up to 10 simultaneous calls. The IMUSIC client can be used to support MOH even if no external audio source is connect to the IP PBX. The PL and AA can handle up to 10 calls simultaneously. A soft limit of less than 10 simultaneous calls may apply when multiple features are executing at the same time. These simultaneous call limits are merely example and may vary, depending on the configuration and hardware of the IP PBX 160. Each line interface 201-204 may act as a Back-to-back User Agent (B2BUA). The B2BUA operates like a user agent towards both ends of a SIP call, and is responsible for handling all SIP signaling between both ends of the call, from call establishment to termination. In other embodiments, one or more of these internal client components may be omitted and/or provided as external clients.

The Media proxy server component 212 routes media between client stations and the ITSPs. In some embodiments, an alternate path may be used for media where client stations exchange traffic directly with the ITSP. The Configuration Server 214 serves configuration files to the client stations over TFTP.

In particular embodiments, a single IP PBX 160 may be used to support multiple voicemail accounts using a single line interface. As described above with respect to FIG. 1A, the ITSP 120 provides a PSTN gateway 122 for terminating calls to client stations in the LAN 156. The ITSP 120 may further comprise a voicemail system 124 for providing voicemail services to the DID numbers associated with the IP PBX 160. Alternatively, the voicemail services may be provided by a separate IVMSP 126, as shown in FIG. 1B. These voicemail services may include, e.g., storing incoming voicemail messages from callers, notifying client stations of a change in the status of a mailbox, and playback of stored voicemail messages. By utilizing the ITSP 120 (or IVMPSP 126) to provide voicemail services for the LAN 156, the SIP IP PBX 160 need not be configured to provide voicemail services, thereby reducing the complexity and cost of the IP PBX 160.

In particular embodiments, the IP PBX 160 subscribes to message-summary event notification from a voicemail service provider, such as the voicemail system 124 of the ITSP 120 or the voicemail system 124 of the IVMSP 126. This subscription is only for the primary SIP URL of the IP PBX 160 and does not necessarily need to include individual subscriptions for each of the mailboxes associated with that SIP URL. This subscription establishes a binding of the primary SIP URL to the IP PBX 160. The voicemail system 124 would have information regarding the mailboxes that are associated with this main number. This information may have been provided at a variety of times, such as, e.g., upon initial configuration of the VoIP services for the IP PBX 160, during a later configuration step, or may be contained in the subscription message from the IP PBX 160.

Under the conventional SIP protocol, SIP requests have a Request-Line for a start-line. The Request-Line contains a method name (e.g., NOTIFY), a Request-URI (Uniform Resource Identifier), and the SIP protocol version. SIP uses Uniform Resource Locators (URLs) to identify the source, current destination, ultimate destination, and to specify redirection (forwarding) addresses. Therefore, the Request-URI will comprise a SIP URL which corresponds to the user or service to which this request is being addressed.

The header is a component of a SIP message that conveys information about the message. The header comprises a sequence of one or more header field rows. A header field row comprises a header field name and zero or more header field values. A valid SIP request contains at least the following additional header fields: TO, FROM, CSEQ, CALL-ID, MAX-FORWARDS, and VIA. Typically, the TO field contains a display name and a SIP URL set to the value of the URI in the Request-URI.

When there is a change in the status of any of the mailboxes associated with the primary SIP URL of the IP PBX 160, the voicemail system 124 will send an event notification message (e.g., a SIP NOTIFY message) to the IP PBX 160. The event notification message will include a Request-URI identifying the primary SIP URL. However, the voicemail system 124 will embed the identification of the target client station inside the message (e.g., by specifying a Mailbox-ID in the "TO" field of the SIP NOTIFY message header as an additional parameter). When the IP PBX 160 receives the event notification message, the IP PBX 160 will extract the identification of the target mailbox from the message header, map the target mailbox to one or more client stations 170 served by the IP PBX 160, and route an event notification message to the corresponding station(s) informing the station(s) of the change in mailbox status. As a result, the voicemail system 124 can provide voicemail services to a plurality of mailboxes, while only maintaining a single voicemail subscription, with a single user-ID and password. Thus, the IP PBX registers a single address with the voicemail system. The ITSP will use the binding from this registration for a group of mailboxes allocated to this address.

Figure 3:
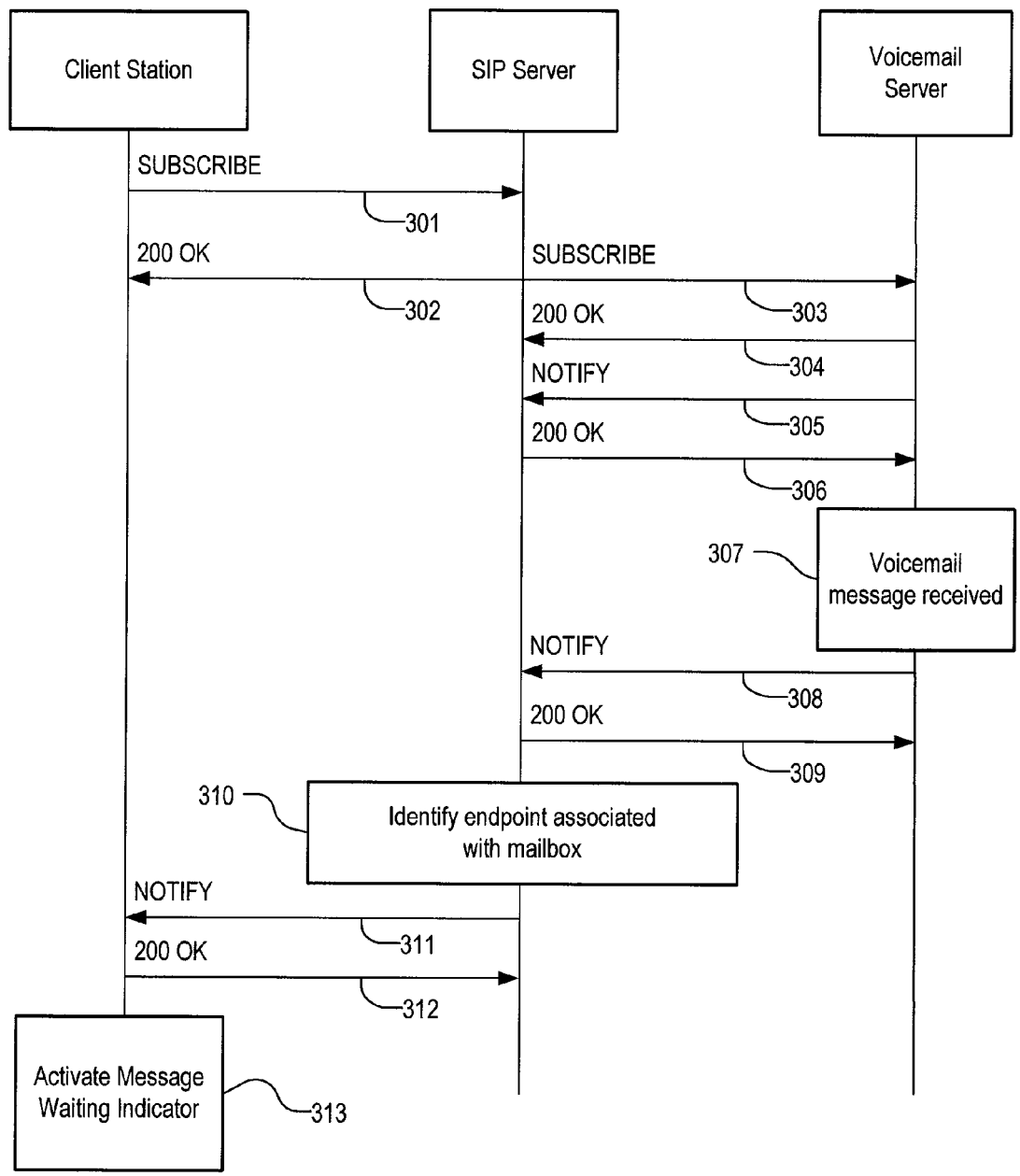
FIG. 3 illustrates an example message flow.

FIG. 3 illustrates an example message flow, in particular embodiments. In order for each client station 170 to receive voicemail notifications, a Mailbox-ID is configured on the client station 170. A unique Mailbox-ID may be configured for each extension of the client station (e.g., in one embodiment, each client station may support up to four extensions). After the client station 170 completes its initial configuration registration with the IP PBX 160, the SIP user agent for the client station 170 may subscribe to voicemail services with the IP PBX 160. As shown in FIG. 3, this may be accomplished in step 301 by transmitting a SIP SUBSCRIBE message to the IP PBX 160. In step 302, the IP PBX 160 responds with a 200 OK message.

The basic framework for the SUBSCRIBE/NOTIFY process is described in RFC-3265, incorporated by reference herein in its entirety. The use of the SUBSCRIBE/NOTIFY process for supporting message waiting indication (MWI) is described in RFC-3842, incorporated by reference herein in its entirety. The purpose of the SUBSCRIBE message in step 301 is to inform the IP PBX 160 that the station 170 should be notified of any status update of the mailbox with that extension's Mailbox-ID. Although the format of the SUBSCRIBE message may vary, the following is an example SUBSCRIBE message that may be used:

SUBSCRIBE sip: 192.168.0.1:6060 SIP/2.0
Via: SIP/2.0/UDP 192.168.0.4:5060; branch=z9hG4bK-44f9d0f0
From: "John User" <sip:5031@192.168.0.1:6060>; tag=ac6013983cce7526
To: <sip:15031@192.168.0.1:6060>
Call-ID: ace86200-bbe839de@192.168.0.4
CSeq: 63017 SUBSCRIBE
Max-Forwards: 70
Contact: "John User" <sip:5031@192.168.0.4:5060>
Expires: 2147483647
Event: message-summary
User-Agent: Sipura/SPA841-3.1.4(a0714sec)
Content-Length: 0

In this example, user-ID field in the TO header carries the Mailbox-ID (e.g., 15031) associated with the voice mailbox to which the client station wishes to subscribe. In this implementation, the first digit (e.g., 1) in the Mailbox-ID identifies the line interface 201-204 of the IP PBX 160 where the mailbox is located, and the remaining digits (e.g., 5031) identify the mailbox. Therefore, this SUBSCRIBE message informs the IP PBX 160 that the client station should be notified for status changes to mailbox 5031 on Line 1. In other implementations, the identification of the line interface may be omitted. This may be the case when the IP PBX includes only a single line interface and/or a single SIP trunk, or if the IP PBX includes multiple line interfaces, but utilizes the same line interface for all voicemail notifications. In addition, the Mailbox-ID in the example above corresponds to a DID number associated with that client station. In other embodiments, the Mailbox-ID may correspond to any other unique string. In some cases, a client station may not even be assigned a DID number, but will be assigned a mailbox. Other variations are possible and the format for identifying the mailbox may vary, depending on the particular configuration of the IP PBX and the voicemail SP.

The CONTACT header in the SUBSCRIBE request informs the IP PBX 160 where to send the event notification message when the mailbox status changes. In this case, the client station to receive the event notification message is 5031@192.168.04.4:5060. In some embodiments, only a single subscription is necessary, and the association between the client station and the IP PBX 160 is retained until a new subscription is generated.

In step 303, the IP PBX 160 will transmit a subscription message to the user agent associated with the voicemail system 124 to declare its interest in changes in status of the mailboxes associated with the primary SIP URL. In step 304, the voicemail system 124 confirms receipt of this subscription. This subscription may be only for the primary SIP URL of the IP PBX 160 and does not necessarily need to include individual subscriptions for each of the mailboxes associated with that SIP URL, so long as the voicemail system 124 receives information regarding the mailboxes to associate with the SIP URL through other channels. Although the format of the SUBSCRIBE message may vary, the following is an example SUBSCRIBE message that may be used:

SUBSCRIBE sip:company-mailbox@sip.myitsp.com SIP/2.0
Via: SIP/2.0/UDP 172.16.22.23:5062; branch=z9hG4bK-44f9d0f0
From: Line 3<sip:14089991003@sip.myitsp.com>; tag=ac6013983cce7526
To: <sip:company-mailbox@sip.myitsp.com>
Call-ID: ace86200-bbe839de@172.16.22.23

CSeq: 63017 SUBSCRIBE
Max-Forwards: 70
Contact: <sip:company-mailbox@172.16.22.23:5062>
Expires: 2147483647
Event: message-summary
User-Agent: Sipura/SPA9000-3.2.2
Content-Length: 0

In this case, the primary SIP URL is sip:company-mailbox@sip.myitsp.com. Therefore, the event notifications from the voicemail system 124 for all of the mailboxes associated with the primary SIP URL will be transmitted to the primary SIP URL. The identification of the mailbox will be provided elsewhere in the event notification message, as will be described in greater detail below.

In some embodiments, immediately after the initial voicemail subscription request, the voicemail system 124 will transmit to the IP PBX 160 in step 305 an event notification message for each mailbox to communicate the current state of all of the mailboxes associated with that IP PBX 160. The IP PBX 160 will confirm receipt in step 306. This event notification message regarding the change in state of the mailbox can be provided in a variety of forms. The following is an example NOTIFY message that may be used:

NOTIFY sip:company-mailbox@172.16.22.23:5062 SIP/2.0
Via: SIP/2.0/UDP 178.178.221.230; branch=z9hG4bK-44f9d0f0
From: <sip:voicemail@sip.myitsp.com>; tag=ab789
To: <sip:5031@172.16.22.23:5062>; tag=ac6013983cce7526
Call-ID: ace86200-bbe839de@178.178.221.230
CSeq: 537 NOTIFY
Expires: 2147483647
Event: message-summary
User-Agent: ITSP/Voicemail-Server
Content-Type: application/simple-message-summary
Content-Length: 49
Messages-Waiting: yes
Voice-Message: 2/8 (0/2)

The Request-URI of the NOTIFY references the primary SIP URL provided in the CONTACT header of the corresponding SUBSCRIBE message described above with respect to step 305. The Mailbox-ID for the mailbox whose status is being reported is provided elsewhere in the message. For example, the Mailbox-ID (e.g., 5031) can be provided as the user-id in the TO header of the NOTIFY message. According to the SIP protocol, the interpretation of the characters contained in the TO header is left to the discretion of the user agent. Therefore, the precise format with which the identity of the mailbox is provided may vary and the use of a TO header which does not match the Request-URI is unconventional, but not in conflict with the SIP protocol.

In other embodiments, the TO header may first identify the same SIP URL provided in the Request-URI, and the Mailbox-ID may be indicated elsewhere in the TO header, as follows:

NOTIFY sip:company-mailbox@172.16.22.23:5062 SIP/2.0
To: <sip:company-mailbox @172.16.22.23:5062>; mailbox=5031

In step 307, a voicemail message is received by the voicemail system 124 for one of the mailboxes associated with the primary SIP URL. This voicemail message may have been received from a variety of sources, such as a call from a telephone 112 in the PSTN 110, or as a forward from another mailbox in the voicemail system. Because there has been a change in the state of the mailbox, the voicemail system 124 in step 308 will transmit an event notification message (e.g., a NOTIFY message) to the primary SIP URL. The IP PBX 160 will confirm in step 309. This event notification message may have the same format as described above with respect to step 305. Specifically, the Request-URI of the NOTIFY message is the primary SIP URL and the identification of the mailbox whose state is being reported is provided elsewhere in the message.

In step 310, the IP PBX 160 will identify the client station associated with the mailbox identified in the NOTIFY message in step 308. The IP PBX 160 may maintain a database of all of the client station associations, based on the SUBSCRIBE message received from each of the client stations. Once the corresponding client station (or client stations, if the mailbox is associated with multiple stations) is determined, the IP PBX 160 in step 311 will forward the NOTIFY message from the voicemail system 124 using the client station's URL as the Request-URI of the NOTIFY message. In step 312, the client station will confirm receipt. In step 313, the client station 170 associated with the mailbox may then activate a Message Waiting Indicator, which may be, e.g., an LED on the handset or a message on a display. The user at the client station 170 may then retrieve the voicemail messages at his or her own convenience.

Particular embodiments may provide various advantages not provided by prior art systems. As described above, the ITSP 120 need not maintain separate accounts for each of the mailboxes associated with the IP PBX 160. The event notification messages for all of the mailboxes may be transmitted to the primary SIP URI associated with that IP PBX 160, with the mailbox identification provided elsewhere in the message. As a result, the IP PBX 160 need not be configured to support voicemail services, but the ITSP managing the voicemail services need not be burdened with maintaining the accounts for all of the mailboxes.

While the invention has been described in terms of particular embodiments and illustrative figures, those of ordinary skill in the art will recognize that the invention is not limited to the particular embodiments or figures described. For example, in many of the embodiments described above, the identity of the mailbox (e.g., the Mailbox-ID) is provided in the TO field of the NOTIFY message. In other embodiments, the identity of the mailbox may be contained elsewhere in the NOTIFY message, such as in one of the other headers defined by the SIP specification, or in a new header defined by the signaling server manufacturer.

In embodiments described above, a single client station may subscribe with the IP PBX to receive status notifications for one or more mailboxes. Similarly, in some cases, multiple client stations may subscribe to receive status notifications for the same mailbox. This may be useful, for example, when both a manager and the manager's assistant wish to receive notifications of new voicemails. When the IP PBX receives a NOTIFY message of a mailbox status change from the IVMSP, the IP PBX in turn will transmit a NOTIFY message to all of the client stations that have subscribed to that mailbox. As a result, both the manager's and the assistant's stations may be configured to provide a message waiting indication whenever the manager's voice mailbox receives a new message. The IVMSP need not have any knowledge regarding which client stations should be notified of mailbox status changes; all the IVMSP does is to transmit a NOTIFY message to the main subscriber (e.g., the IP PBX). This can enable the administrator of the IP PBX to flexibly and dynamically set the local mailbox notification policies without involving the IVMSP.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
    at a Session Initiation Protocol (SIP) based Internet Protocol private branch exchange (IP PBX), receiving an event notification message from a user agent corresponding to a voicemail system from a service provider, said event notification message comprising a Request-URI field identifying a Uniform Resource Identifier (URI) of the SIP based IP PBX and a header field identifying a target mailbox from a plurality of target mailboxes associated with a single account between the service provider and the SIP based IP PBX having a single user identifier and a single password with a single address registered with the service provider;
    identifying a URI corresponding to the target mailbox; and
    forwarding the event notification message with a Request-URI field identifying the URI corresponding to the target mailbox, wherein the service provider sends the event notification message to a primary SIP Uniform Resource Locator (URL) for the single account each time at least one of the plurality of target mailboxes experiences a change in status and wherein the service provider only maintains one account to service the SIP based IP PBX with different mailbox identifiers for each mailbox within the one account.

2. The method of claim 1, wherein the event notification message includes a status of a voicemail account associated with the target mailbox.

3. The method of claim 1, wherein the event notification message comprises a SIP NOTIFY message.

4. The method of claim 1, wherein the header field identifying the target mailbox comprises a TO field of the event notification message.

5. The method of claim 1, further comprising receiving at the SIP based IP PBX a SUBSCRIBE request from a target client station associated with the target mailbox.

6. The method of claim 5, further comprising in response to said receiving at the SIP based IP PBX the SUBSCRIBE request from the target client station, transmitting a SUBSCRIBE request to the user agent corresponding to the voice mail system.

7. The method of claim 1, wherein the SIP based IP PBX is provided in a local area network (LAN) containing a target client station associated with the target mailbox.

8. The method of claim 1, further comprising: in response to receiving the event notification message at the SIP based IP PBX, retrieving a network location of a target client station associated with the target mailbox.

9. The method of claim 8, wherein said retrieving the network location of the target client station comprises retrieving the network location from a database stored in the SIP based IP PBX.

10. The method of claim 8, wherein said retrieving the network location of the target client station comprises retrieving an IP address of the target client station.

11. The method of claim 1, further comprising:
    in response to receiving the event notification message at the SIP based IP PBX, retrieving a network location of a plurality of target client stations associated with the target mailbox;
    wherein said forwarding the event notification message with the Request-URI field identifying the URI corresponding to the target mailbox comprises forwarding the event notification message to a plurality of client stations associated with the target mailbox.

12. A system, comprising:
    an Internet Protocol private branch exchange (IP PBX) configured to:
        receive an event notification message from a user agent corresponding to a voice mail system from a service provider, said event notification message comprising a Request-URI field identifying a Uniform Resource Identifier (URI) of the IP PBX and a header field identifying a target mailbox from a plurality of target mailboxes associated with a single account between the service provider and the IP PBX having a single user identifier and a single password with a single address registered with the service provider;
        identify a URI corresponding to the target mailbox; and
        forward the event notification message with a Request-URI field identifying the URI corresponding to the target mailbox, wherein the service provider sends the event notification message to a primary SIP Uniform Resource Locator (URL) for the single account each time at least one of the plurality of target mailboxes experiences a change in status and wherein the service provider only maintains one account to service the IP PBX with different mailbox identifiers for each mailbox within the one account.

13. The system of claim 12, wherein the event notification message includes a status of a voicemail account associated with the target mailbox.

14. The system of claim 12, wherein the event notification message comprises a SIP NOTIFY message.

15. The system of claim 12, wherein the header field identifying the target mailbox comprises a TO field of the event notification message.

16. The system of claim 12, wherein the IP PBX is further configured to receive a SUBSCRIBE request from a target client station associated with the target mailbox.

17. The system of claim 16, wherein in response to said receiving the SUBSCRIBE request from the target client station, the IP PBX is configured to transmit a SUBSCRIBE request to the user agent corresponding to the voice mail system.

18. The system of claim 12, further comprising a local area network (LAN) comprising the IP PBX and a target client station associated with the target mailbox.

19. The system of claim 12, wherein in response to receiving the event notification message, the IP PBX is configured to retrieve a network location of a target client station associated with the target mailbox.

20. The system of claim 19, wherein the IP PBX is configured to retrieve the network location of the target client station by retrieving the network location from a database stored in the IP PBX.

21. The system of claim 19, wherein the IP PBX is configured to retrieve the network location of the target client station by retrieving an IP address of the target client station.

22. The system of claim 12, wherein:
in response to receiving the event notification message, the IP PBX is configured to retrieve a network location of a plurality of target client stations associated with the target mailbox; and
the IP PBX is configured to forward the event notification message with the Request-URI field identifying the URI corresponding to the target mailbox by forwarding the event notification message to a plurality of client stations associated with the target mailbox.

23. The system of claim 12, further comprising the user agent corresponding to the voicemail server, said user agent being configured to transmit the event notification message having the Request-URI field identifying the URI of the IP PBX and the header field identifying the target mailbox.

* * * * *